United States Patent [19]

Ratzlaff

[11] Patent Number: 5,223,973
[45] Date of Patent: Jun. 29, 1993

[54] CASE FOR HOLDING A BINOCULAR

[75] Inventor: Jörg Ratzlaff, Altensteig, Fed. Rep. of Germany

[73] Assignee: Carl-Zeiss-Stiftung, Heidenheim, Fed. Rep. of Germany

[21] Appl. No.: 804,672

[22] Filed: Dec. 10, 1991

[30] Foreign Application Priority Data

Dec. 10, 1990 [DE] Fed. Rep. of Germany ... 9016687[U]

[51] Int. Cl.$^5$ .................. G02B 23/00; B65D 85/38
[52] U.S. Cl. .................. 359/409; 359/507; 206/316.3
[58] Field of Search .................. 359/404–419, 359/480, 481, 507, 511–514, 808–813, 819, 399, 402, 404, 409, 503, 506–507, 510–511, 809, 815–817, 896; 2/6, 94, 251, 252; 224/262, 907–911; 206/45.17, 316.1–361.3; D3/33; D16/130, 131, 133

[56] References Cited

U.S. PATENT DOCUMENTS

| | | | |
|---|---|---|---|
| 370,975 | 10/1887 | Scheidig | 359/408 |
| 567,215 | 9/1896 | Blank | 359/409 |
| 3,508,805 | 4/1970 | Bray | 359/418 |
| 4,142,566 | 3/1979 | Stolp | 206/45.17 |
| 4,556,159 | 12/1985 | Swain | 224/909 |
| 4,649,973 | 3/1987 | Uchin | 224/908 |
| 4,984,879 | 1/1991 | Plunkett | 359/407 |

Primary Examiner—Bruce Y. Arnold
Assistant Examiner—Thong Nguyen
Attorney, Agent, or Firm—Walter Ottesen

[57] ABSTRACT

The invention relates to a case which permits a binocular to be removed laterally from the case without a cover or the like restricting the removal thereof. The optical surfaces of the binocular in the housing are protected against contamination notwithstanding a lateral removal of the binocular from the case. The invention also relates to the combination of the binocular and the case as well as to the binocular itself.

7 Claims, 5 Drawing Sheets

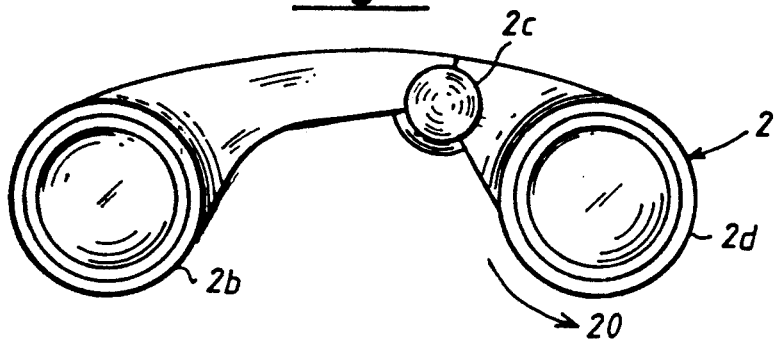
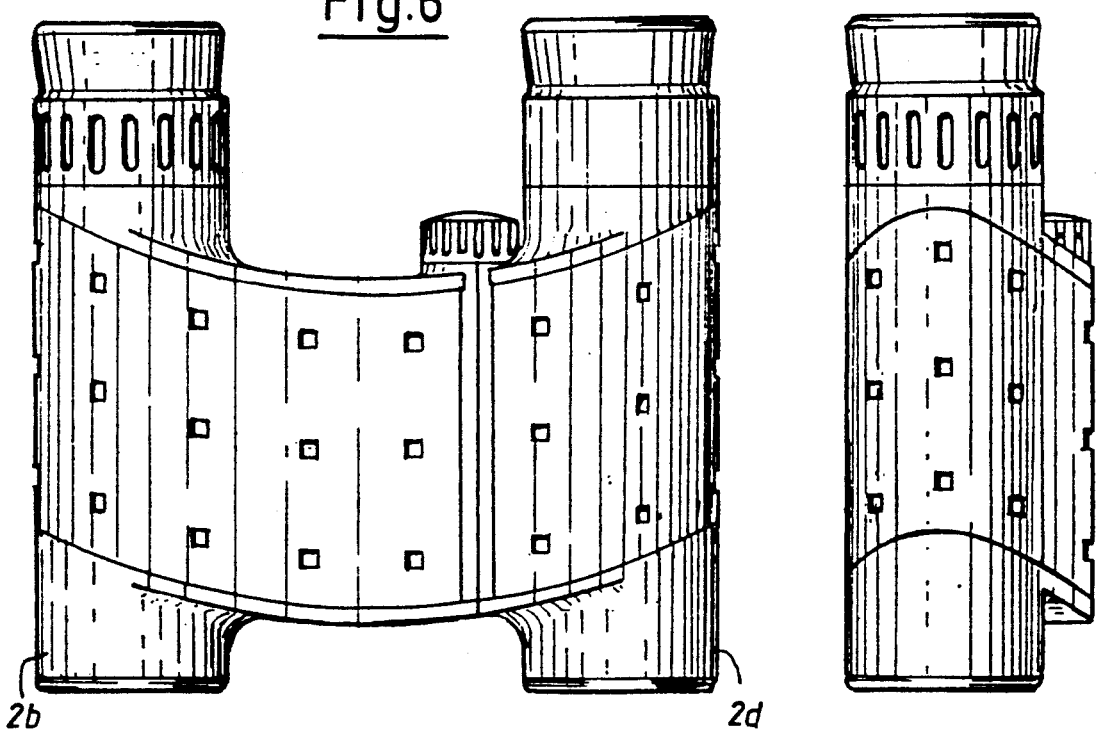
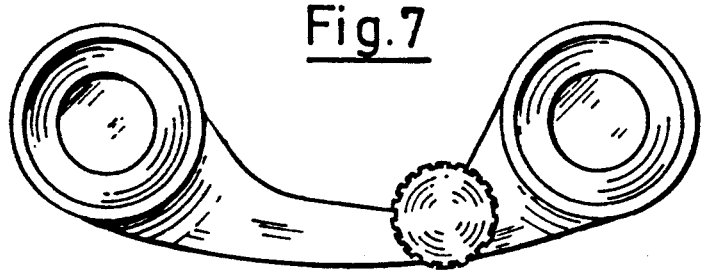

CASE FOR HOLDING A BINOCULAR

FIELD OF THE INVENTION

The invention relates to a case for holding a binocular and the combination of the case and the binocular.

BACKGROUND OF THE INVENTION

Various types of cases for holding pocket binoculars are known. The best known is the so-called pot-shaped case wherein the binocular is inserted in its folded condition and with the case including a closing cover. The space needed for holding the binocular is very large and the removal of the binocular is most inconvenient.

It is also known to store collapsible binoculars in small bags made of various materials such as leather, plastic and the like. This form of storage protects the binocular only against dirt but not against mechanical stress. The removal of the binocular from the bag is also very inconvenient.

SUMMARY OF THE INVENTION

It is an object of the invention to provide a case for holding a binocular which will permit a convenient removal of the binocular and also adequately protect the binocular from contamination.

The case of the invention is for holding a binocular having two barrel-like oculars with holding regions on each ocular where a person holds the binocular when in use. The case includes: a housing defining a longitudinal axis and having two mutually adjacent end walls transverse to this axis; the housing having a side opening extending substantially parallel to the axis to permit insertion of the binocular in a direction causing the barrel-like oculars to remain substantially parallel to the axis while the binocular is inserted and during the storage thereof in the case; and, the side walls being dimensioned so that they fully cover and protect the outer lenses of the oculars during storage in the case.

The binocular can be easily removed from the case through the side opening thereof. The outer surface of the ocular offers sufficient protection for the binocular. However, to ensure the necessary protection against contamination of the exposed optical surfaces of the binocular, it is necessary that the surfaces be closed off tightly against dust when the binocular is stored in the case.

When the case includes a side opening so that one ocular of the binocular is exposed at least in the holding region thereof, then the binocular can be easily removed from the case.

The inner surfaces of the outer walls of the case advantageously provide a configuration which restricts movement in order to make it possible to unfold the binocular when the binocular is removed from the housing with the binocular being at least partially folded during storage in the case. In this way, it is ensured that the binocular is in a use condition as soon as it is removed from the case.

The danger of destroying the binocular is reduced by making the case of a material which additionally provides adequate protection against mechanical stresses occasioned during transport. The particular purpose of the binocular determines what the mechanical stresses occasioned by transport involve. The improved resistance to stress of the binocular to be obtained with the case can be realized by the stiffness of the case material and/or its thickness. An appropriate lining having elastic material in the interior of the case is also conceivable.

If an elastic coating is provided on the inner surfaces of the casing walls at least in the region of the exposed optical surfaces of the inserted binocular, then a constructive freedom is obtained for the configuration of the case with respect to protection against contamination. If the case is configured to the form of the binocular in its folded condition then the case can be configured so as to be very small and compact. Hold recesses on the housing ensure that the case can be reliably held with one hand when removing the binocular with the other hand from the case.

It is advantageous to provide a loop for a holding band of the binocular so that the case is not lost when the binocular is removed therefrom.

BRIEF DESCRIPTION OF THE DRAWINGS

The invention will now be described with reference to the drawings wherein:

FIG. 6 is a plan view of the binocular;

FIG. 7 is a side elevation view of the end of the binocular facing toward the viewer;

FIG. 8 is a side elevation view of the opposite end of the binocular facing toward the object to be viewed therewith;

FIG. 9 is a side elevation view of the binocular showing the right-hand ocular;

DESCRIPTION OF THE PREFERRED EMBODIMENTS OF THE INVENTION

Figure 1:
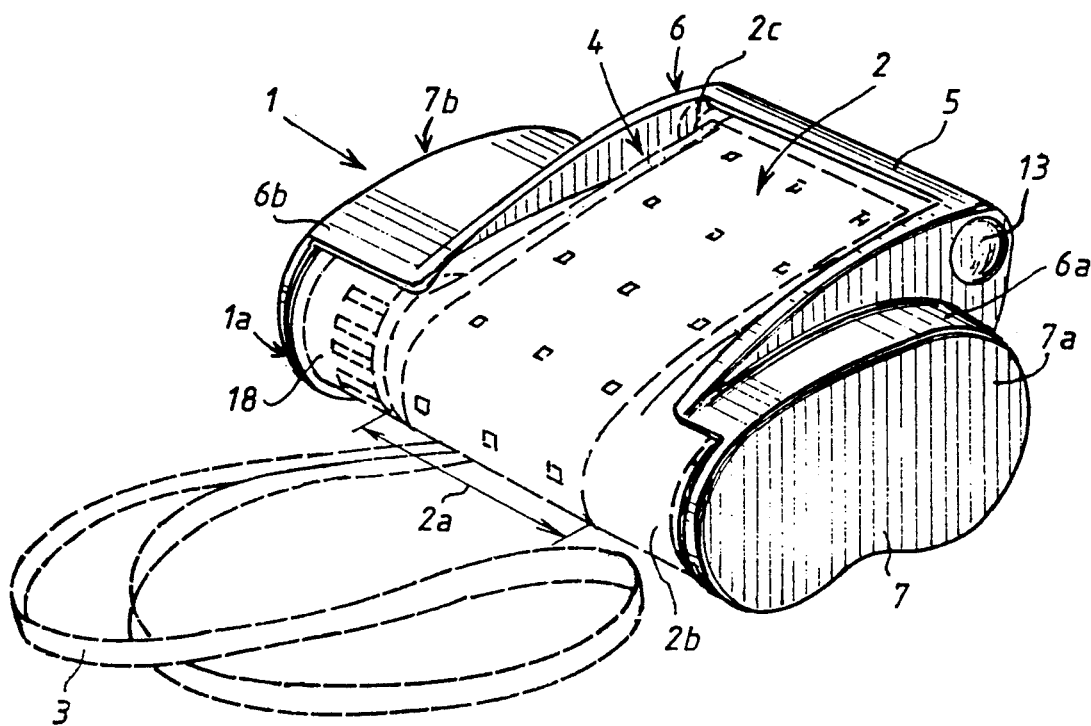
FIG. 1 is a perspective view of the holding case according to the invention with the case holding a binocular.
Figure 5:
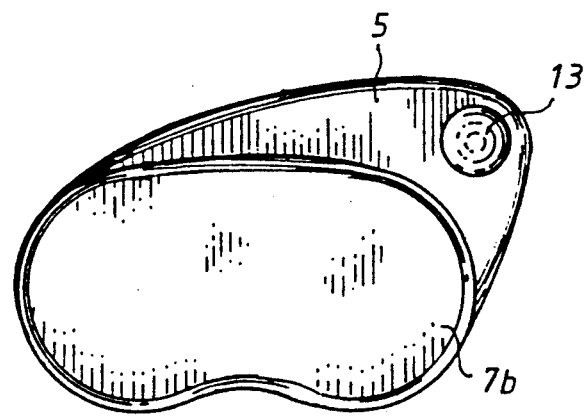
FIG. 5 is a side elevation view of one end of the holding case of FIG. 1.
Figure 2:
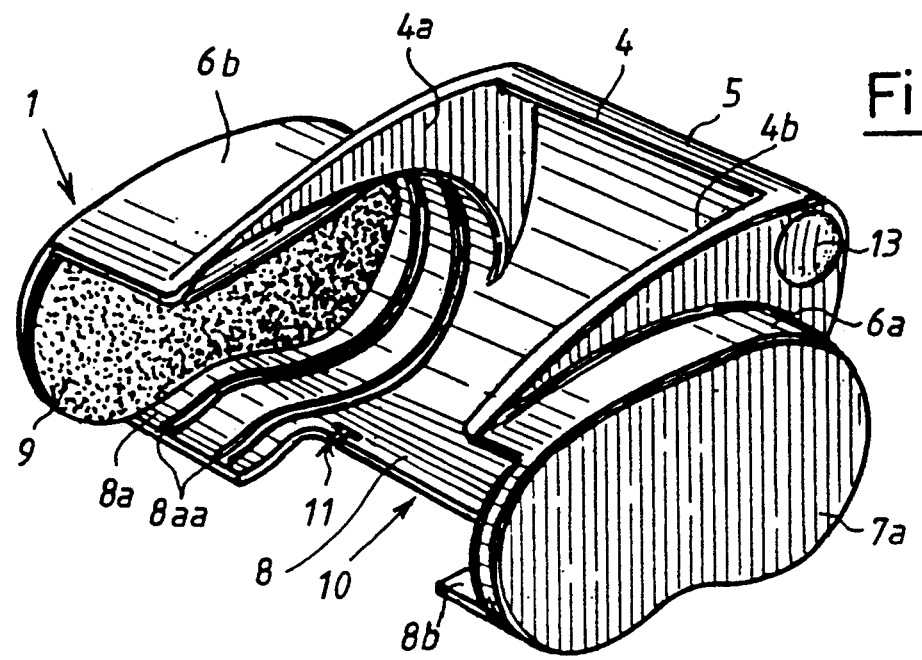
FIG. 2 is a perspective view of the holding case of FIG. 1 with the binocular removed.
Figure 3:
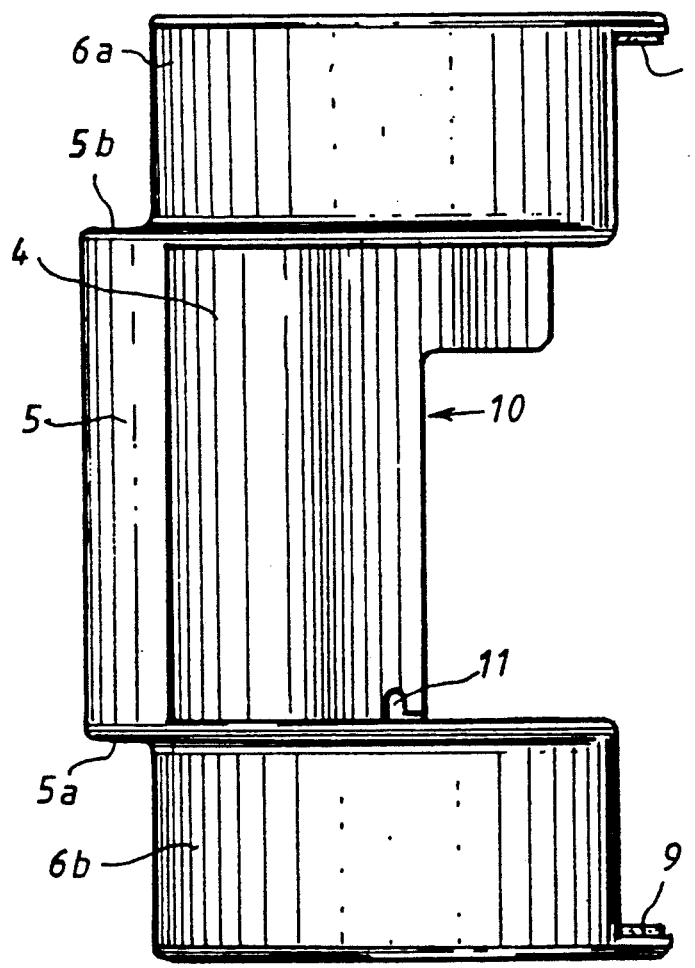
FIG. 3 is a side elevation view of the forward side of the holding case of FIG. 1.
Figure 4:
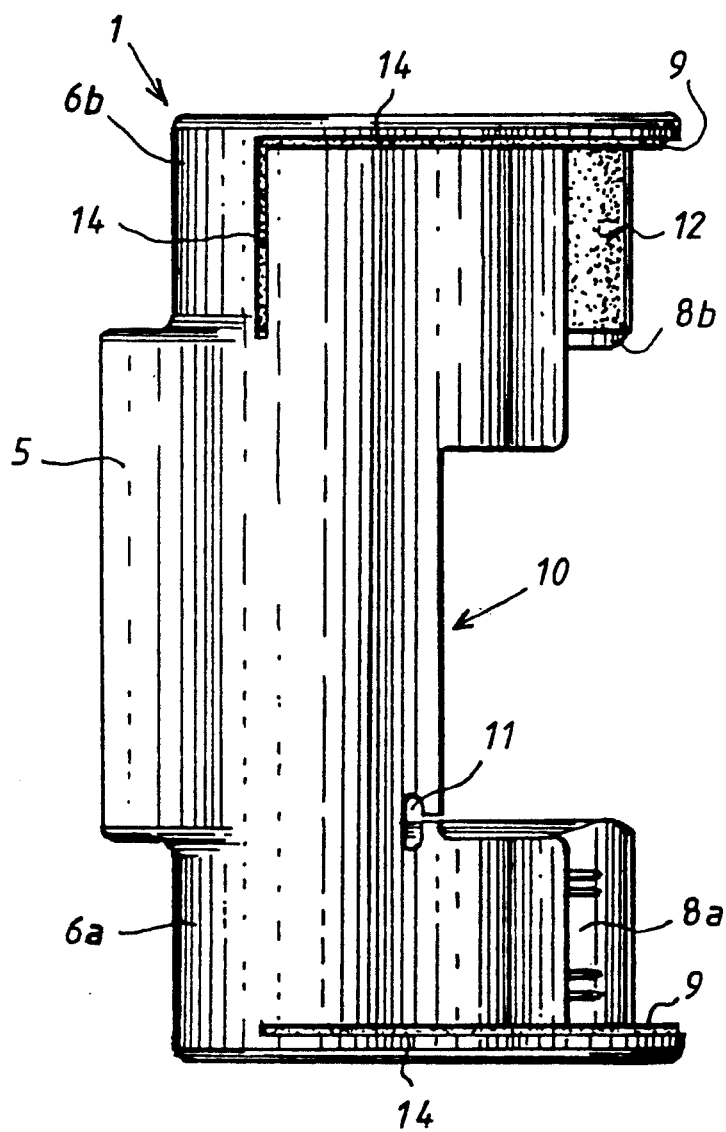
FIG. 4 is a side elevation view of the rearward side of the holding case of FIG. 1.
Figure 10:
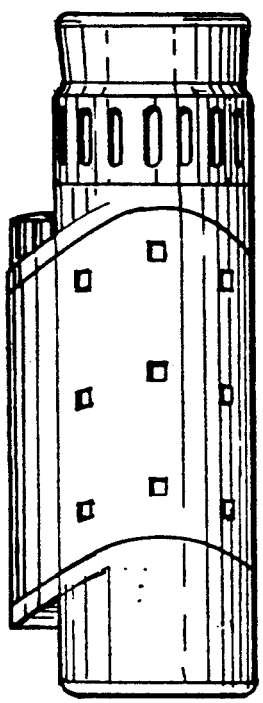
FIG. 10 is a side elevation view of the binocular showing the left-hand ocular.
Figure 11:
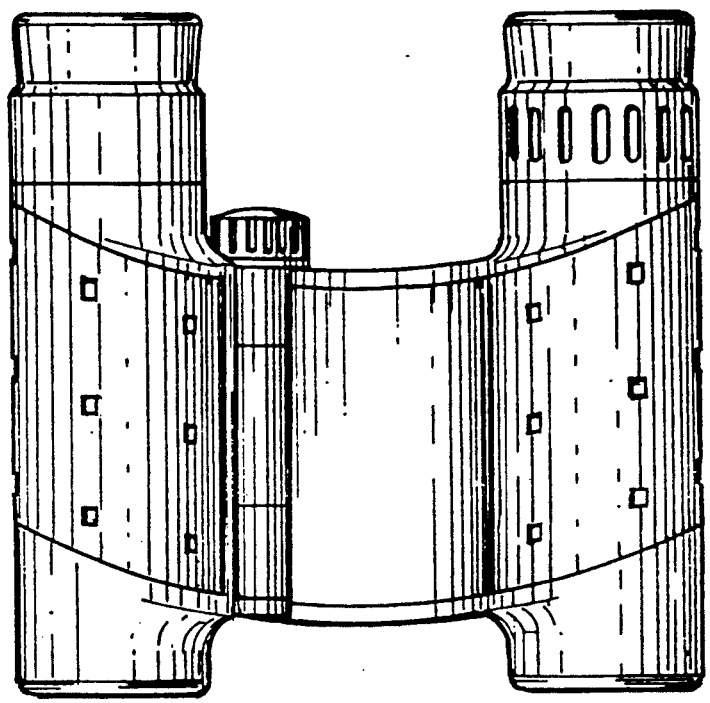
FIG. 11 is a plan view of the binocular of FIG. 6 as seen from below.

The case 1 shown in FIGS. 1 to 5 is provided for holding a binocular 2 and is configured so as to be partially open. The half open case is so configured that the binocular 2 inserted therein together with the case conjointly define the outer surfaces.

The optics for a binocular 2 are especially to be protected by the case 1. For this reason, the case 1 provides an additional mechanical safety for the binocular and protects the exposed optical surfaces against contamination.

The case 1 is made of a material having mechanical characteristics which provide an adequate protection for normal mechanical stresses for the binocular 2 inserted into the case. This is achieved with an adequate material thickness and/or by a mechanical stiffness which is of sufficient magnitude.

To ensure an adequate protection for the optical surfaces of the binocular 2 against contamination while at the same time making it possible to easily remove the binocular from the case, the case is so configured that the binocular 2 is introduced laterally into the case 1 for storage. For this purpose, the case 1 includes a side opening 1a.

The upper and lower boundary walls (7a, 7b) of the case 1 are closed and overlap the optical surfaces of the inserted binocular 1 also at the lateral opening 1a of the case. An elastic coating 9 is provided on the inner sides of the end walls (7a, 7b). This coating 9 closes off the exposed optical surfaces in a dust-tight manner in this region when the binocular is introduced into the case.

Figure 12:
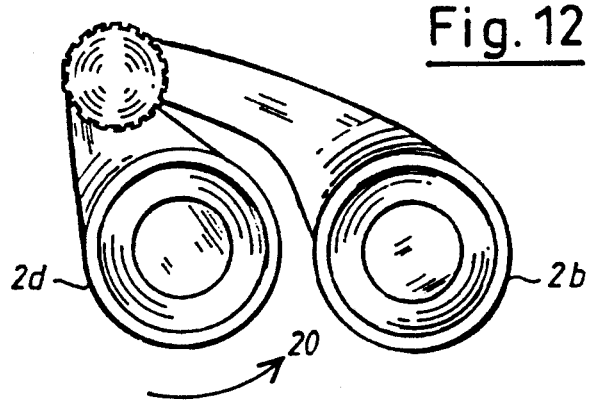
FIG. 12 is a side elevation view corresponding to that of FIG. 7 except that the binocular is shown with the oculars folded.

The case is configured to conform to the form of the binocular 2. In order to obtain the most compact, small case, the binocular is stored in its folded condition as shown in FIG. 12.

The side opening 1a of the case 1 extends into a corresponding opening 10 on the rear side and a corresponding opening 4 on the forward side of the case in the holding region 2a of the binocular 2. The opening 10 on the rear side of the case 1 permits the outer ocular 2b of the binocular 2 to be easily grasped. The opening 4 on the forward side of the case 1 is configured to be larger than opening 10 and permits a movement of the pivot pin 2c of the binocular when removing the binocular 2 from the case. The spacing between inset walls 4a and 4b is selected to permit the pivot pin 2c to move upwardly in the opening 4 as the binocular is removed from the case.

The outer walls (6a, 6b) which extend from the end walls (7a, 7b) are slightly arcuate both within and outside of the case. They permit an ergonomic round movement when taking the binocular 2 out of the case 1. The inner surfaces 8 of the outer walls (6a, 6b) outside of the hold region 2a of the binocular apply a certain amount of resistance to the binocular 2 so that the binocular 2 disposed in its folded position (FIG. 12) within the case can automatically unfold when removed therefrom. In order to obtain an appropriate resistance, jamming guide rails 8aa are disposed on the inner surface 8a. In contrast, the lower inner surface 8b is provided with an elastic or felt coating 12 which retards movement. The rails 8aa are provided because the oculars at viewing end 18 are provided with a rubber jacket; however, an elastic coating or felt could be provided in lieu of the rails as on surface 8b.

The slit-like cutouts 14 on the rearward wall of the case provide an elastic deformability of this rearward wall of the housing (leaf-spring principle) which provides an additional elastic resistance when removing the binocular 2 from the case. In this way, an automatic unfolding of the binocular 2 is supported when removed from the case.

As the binocular 2 is drawn out of the case, the ocular 2d deep within the case pivots in the direction of arrow 20 (FIGS. 8 and 12) about pivot pin 2c. The case permits the pivot movement because of the drag resistance on ocular 2d. The friction at the interface of the case and oculars is selected so as to be greater than the friction at pivot pin 2c which pivotably interconnects the two oculars (2b and 2d). As the binocular 2 is pulled out of the case, the pivot pin 2c moves up in the opening 4 because of the pivoting action of the ocular 2d in the direction of arrow 20.

The pivot pin 2c of the binocular 2 is off center and closer to ocular 2d than to ocular 2b. This off-center position permits the binocular to be folded to a compact unit as shown in FIG. 12 and facilitates holding the same in the case 1 as shown in FIG. 1.

Hold recesses 13 are provided on the lower wall 5b of the center housing portion and on the upper wall 5a so that the user of the case can reliably hold the binocular when removing the same.

The housing includes a loop 11 through which a holding band 3 of the binocular 2 can be passed so that the case does not become lost when removing the binocular therefrom.

It is understood that the foregoing description is that of the preferred embodiments of the invention and that various changes and modifications may be made thereto without departing from the spirit and scope of the invention as defined in the appended claims.

What is claimed is:

1. A case for holding a foldable binocular having two barrel-like oculars with holding regions on each ocular where a person holds the binocular when said binocular is withdrawn from said case and in use, the oculars having outer lenses and the case comprising:

a housing defining a longitudinal axis and having two end walls transverse to said axis;

said housing having a side opening extending substantially parallel to said axis to permit insertion of said binocular in a direction causing said barrel-like oculars to remain substantially parallel to said axis while said binocular is inserted and during a storage thereof folded in said case;

said end walls being dimensioned so that they fully cover and protect the outer lenses of said oculars during storage in said case; and, said housing having forward and rearward walls extending between said end walls; and, said forward and rearward walls having respective cutouts formed therein which extend into said side opening to form a widened opening permitting the person to grasp the binocular at the holding region of the ocular nearest said side opening when withdrawing said binocular from said case.

2. The case of claim 1, wherein said ocular nearest said side opening being the outermost ocular and the other ocular being the innermost ocular when said binocular is seated in said case; and, wherein the binocular includes pivot means for pivotally interconnecting said oculars so as to pivot about a pivot axis parallel to said oculars so as to permit said oculars to collapse into a storage position and to unfold into a use position; said forward and rearward walls having respective inner wall surfaces; friction means formed on said inner wall surfaces for applying a drag force to said innermost ocular when said binocular is withdrawn from said case by the person; and, said pivot means being adapted to have a friction force selected to be less than said drag force thereby permitting said oculars to unfold into said use position as said binocular is withdrawn from said case by the person.

3. The case of claim 1, said case being made of a material which provides adequate protection against mechanical stresses imparted during transport of said case holding said binocular.

4. The case of claim 1, wherein the binocular includes pivot means for pivotally interconnecting said oculars so as to pivot about a pivot axis parallel to said oculars so as to permit said oculars to collapse into a storage position and to unfold into a use position.

5. The case of claim 1, said housing having forward and rearward walls extending between said end walls;

and, said housing having grasping recesses formed in said forward and rearward walls for facilitating manipulation of said case by the person when inserting and removing the binocular.

6. A case for holding a foldable binocular having two barrel-like oculars with holding regions on each ocular where a person holds the binocular when said binocular is withdrawn from said case and in use, the oculars having outer lenses and the case comprising:

a housing defining a longitudinal axis and having two end walls transverse to said axis;

said housing having a side opening extending substantially parallel to said axis to permit insertion of said binocular in a direction causing said barrel-like oculars to remain substantially parallel to said axis while said binocular is inserted and during a storage thereof folded in said case;

said end walls being dimensioned so that they fully cover and protect the outer lenses of said oculars during storage in said case;

said end walls having respective inner end wall surfaces; and, elastic coating means formed on said inner end wall surfaces for protecting said lenses against dust when said binocular is seated in said housing.

7. A case for holding a foldable binocular having two barrel-like oculars with holding regions on each ocular where a person holds the binocular when said binocular is withdrawn from said case and in use, the oculars having outer lenses and the case comprising:

a housing defining a longitudinal axis and having two end walls transverse to said axis;

said housing having a side opening extending substantially parallel to said axis to permit insertion of said binocular in a direction causing said barrel-like oculars to remain substantially parallel to said axis while said binocular is inserted and during a storage thereof folded in said case;

said end walls being dimensioned so that they fully cover and protect the outer lenses of said oculars during storage in said case; and, said housing having a loop formed thereon for accommodating a holding band of the binocular.

* * * * *